(12) United States Patent
Takagi et al.

(10) Patent No.: US 7,901,608 B2
(45) Date of Patent: Mar. 8, 2011

(54) TIRE VULCANIZING METHOD AND VULCANIZER FOR PERFORMING THE METHOD

(75) Inventors: Chikara Takagi, Hashima (JP); Shigeaki Nomura, Hashima (JP); Ryuichi Nakagawa, Hashima (JP)

(73) Assignees: Fuji Shoji Co., Ltd., Hashima-shi (JP); Fuji Seiko Co., Ltd., Hashima-shi (JP)

( * ) Notice: Subject to any disclaimer, the term of this patent is extended or adjusted under 35 U.S.C. 154(b) by 957 days.

(21) Appl. No.: 10/565,680

(22) PCT Filed: Jul. 8, 2004

(86) PCT No.: PCT/JP2004/010063
§ 371 (c)(1),
(2), (4) Date: Jan. 24, 2006

(87) PCT Pub. No.: WO2005/009713
PCT Pub. Date: Feb. 3, 2005

(65) Prior Publication Data
US 2006/0243370 A1 Nov. 2, 2006

(30) Foreign Application Priority Data

Jul. 25, 2003 (JP) ................................. 2003-279729

(51) Int. Cl.
*B29D 30/00* (2006.01)

(52) U.S. Cl. ...... 264/326; 264/501; 264/502; 264/328.3; 425/26; 425/49; 425/28.1; 425/340; 425/363; 156/110.1

(58) Field of Classification Search .................. 264/502, 264/326, 501, 328.3; 425/26, 49, 28.1, 340, 425/363; 156/110.1
See application file for complete search history.

(56) References Cited

U.S. PATENT DOCUMENTS 2,824,336 A 2/1958 Weigold et al.
2,880,458 A 4/1959 Frohlich et al.
(Continued)

FOREIGN PATENT DOCUMENTS

EP 0 529 331 A1 3/1993
(Continued)

*Primary Examiner* — Khanh Nguyen
*Assistant Examiner* — Saeed M Huda
(74) *Attorney, Agent, or Firm* — Oblon, Spivak, McClelland, Maier & Neustadt, L.L.P.

(57) ABSTRACT

A bladder is made to be expandable and contractible at a vulcanization position within a lower mold assembly and to be expandable and contractible also at a tire delivery position which is spaced a predetermined distance from the vulcanization position along a center axis of the lower mold assembly. With a centering shaft passing through an upper mold, the bladder and the lower mold assembly, a green tire loaded into the tire delivery position is held by the bladder by expanding the bladder and is loaded by the bladder into the lower mold assembly. After a vulcanization processing, the bladder removes the vulcanized tire from the vulcanization position to the delivery position, and after the centering shaft is drawn out from the lower mold assembly and the bladder, the bladder is contracted at the delivery position to make it possible to release the vulcanized tire from the bladder. Thus, the green tire is supported evenly at the whole area on the internal surface thereof by the bladder which is expanded to a predetermined shape at the stage of receiving the green tire at the delivery position. Thus, the forming shape of the green tire can be fixed accurately, so that the tire shape after the vulcanization processing can be maintained accurately.

3 Claims, 4 Drawing Sheets

U.S. PATENT DOCUMENTS

| | | | |
|---|---|---|---|
| 3,171,162 A | 3/1965 | Soderquist | |
| 3,790,656 A | 2/1974 | Getz | |
| 3,909,337 A | 9/1975 | Yabe | |
| 3,932,088 A | 1/1976 | Harada et al. | |
| 3,976,409 A | 8/1976 | Athey | |
| 4,035,117 A | 7/1977 | Nakagawa et al. | |
| 4,444,715 A | 4/1984 | Nixon et al. | |
| 5,486,319 A * | 1/1996 | Stone et al. | 264/406 |
| 2002/0053759 A1 * | 5/2002 | Caretta | 264/501 |

FOREIGN PATENT DOCUMENTS

| | | |
|---|---|---|
| EP | 1 077 122 A2 | 2/2001 |
| JP | 49-15777 | 2/1974 |
| JP | 49-24286 | 3/1974 |
| JP | 49024286 * | 3/1974 |
| JP | 50-37877 | 4/1975 |
| JP | 51-136765 | 11/1976 |
| JP | 57-199639 | 12/1982 |
| JP | 63-280604 | 11/1988 |
| JP | 5-261736 | 10/1993 |
| JP | 8-39568 | 2/1996 |
| JP | 9-38977 | 2/1997 |
| JP | 10-76529 | 3/1998 |
| JP | 10-156833 | 6/1998 |
| JP | 2001-58323 | 3/2001 |
| JP | 2001-96534 | 4/2001 |
| JP | 2003-62832 * | 3/2003 |
| JP | 2004-58340 | 2/2004 |

* cited by examiner

TIRE VULCANIZING METHOD AND VULCANIZER FOR PERFORMING THE METHOD

TECHNOLOGICAL FIELD

The present invention relates to a tire vulcanizing method and vulcanizer for manufacturing tires which are uniform in width direction as well as in radial directions.

BACKGROUND ART

In manufacturing tires, it is general to manufacture a green case as a base component by winding an inner liner and a body ply around a shaping drum at a shaping step and then by setting bead wires. Then, a green tire is formed by fitting a belt and a tread on the external circumference of the green case. The green tire is unloaded by a handling device from the shaping step and is transferred to a warehouse. In accordance with a production plan, the green tire is transferred to a vulcanizing step after temporal storage or is transferred from the shaping step directly to the vulcanizing step without being stored in the warehouse. At the vulcanizing step, the green tire placed at a predetermined position is grasped by a handling device of a vulcanizer and is loaded into a space which is made by opening a movable upper mold from a stationary lower mold. After the closing of the molds, a bladder is expanded by the pressure of steam or the like inside the green tire as it is stretched within the space to push the external surface thereof on the inner surface of the green tire and hence, to be closely fitted on the inner surface of the green tire, whereby the green tire is heated and pressurized from outside by the molds as well as from inside by the bladder. The vulcanization shaping is terminated upon the expiration of a predetermined time.

A problem arises in that even if shaped to be accurately uniform at the shaping step, unvulcanized green tires are liable to be deformed by experiencing various handlings such as unloading, storage, loading and placement and hence that the uniformity of the vulcanized tires are deteriorated where the vulcanization is carried out with the green tire being off-centered due to such deformation. The technology descried in FIGS. 1 and 2 of Japanese, Unexamined Published Patent Application No. 2001-096534 provides an improved method for coping with the problem. Where this method is practiced, various tools become necessary for each piece of the green tires, resulting in an increase in tire manufacturing cost.

Further, as disclosed in FIG. 1 of Japanese, Unexamined Published Patent Application No. 10-076529 as well as in FIG. 1 of Japanese, Unexamined Published Patent Application No. 10-156833, it has been a practice that at the vulcanizing step, vulcanization is carried out with the green tire put between upper and lower molds of a half cup shape. Thus, the aligning of the upper mold with the lower mold has to be made after the molds are closed, that is, after the starting of the vulcanization, and such aligning cannot be made with the upper mold remaining opened before the starting of the vulcanization.

Further, as disclosed in FIG. 2 of Japanese, Unexamined Published Patent Application No. 57-199639 as well as in FIGS. 2 and 17 of Japanese, Unexamined Published Patent Application No. 09-038977, a bladder for heating and pressurizing the green tire from inside is low in aligning accuracy because it takes a cantilever support construction that extends long from the lower side as both of an upper ring portion and a lower ring portion for the bladder are driven and supported only from the lower side, so that it has been difficult to perform the center-shaping precisely. Furthermore, the off-centering between the upper and lower ring portions becomes easier to occur with the increment in the number of time in use, which makes it unavoidable to use the off-centered bladder. Moreover, drive devices and the like are concentrated on the lower side to have many equipments on the lower side, and this makes the maintenance difficult to do.

Still furthermore, although for uniform shape and uniform thermal conveyance in expanding the bladder, various improvement have been attempted to expand the bladder uniformly at the upper and lower parts thereof, such improvements have not resulted in the expected advantages due to the use of the off-centered bladder.

In addition, as disclosed in Japanese, Unexamined Published Patent Application No. 8-39568, a loading device used in loading green tires into a vulcanizer is usually provided with tire gripping claws which are telescopically movable in the radial directions of the green tire, and operates to enter the gripping claws inside an upper bead of the green tire, then to extend the gripping claws radially outward, then to lift up the green tire with the upper bead only being grasped and finally, to transfer the green tire over a lower mold. Because the deformable green tire is lifted up to be carried at its upper half, the green tire is deformed to damage the symmetry between the upper and lower sides thereof. That is, it has been difficult to load the green tire into alignment with the center axis of the vulcanizer, whereby a problem that the vulcanized tire is low in the quality of uniformity has been unavoidable.

Accordingly, it is a primary object of the present invention to provide a vulcanizing method and vulcanizer capable of performing the vulcanization in the state that upper and lower molds, a bladder and a green tire are centered.

Another primary object of the present invention is to provide a vulcanizing method and vulcanizer capable of loading a green tire into molds without damaging the shape of the green tire.

Another object of the present invention is to provide a vulcanizing method and vulcanizer capable of operating a bladder to expand symmetrically at upper and lower portions thereof and capable of preventing the alignment of upper and lower ring portions of the bladder from getting worse with the increment in the number of time in use.

Still another object of the present invention is to provide a vulcanizer which is easy to maintain, inspect and overhaul.

DISCLOSURE OF THE INVENTION

The present invention resides in a tire vulcanizing method wherein a green tire is loaded into a segmented tread mold having been opened radially outward; wherein a vulcanization processing is performed with the segmented tread mold closed radially inward and with a bladder expanded inside the green tire having been loaded; and wherein upon completion of the vulcanization processing, the vulcanized tire is removed by opening the segmented tread mold radially outward; the method featuring the bladder enabled to expand and contract at a vulcanization position within the segmented tread mold as well as to expand and contract also at a tire delivery position which is a predetermined distance away from the vulcanization position along the axis of the segmented tread mold; and the method featuring the steps of expanding the bladder at the delivery position to make the bladder hold the green tire loaded into the tire delivery position; making the bladder load the green tire into the segmented tread mold at the vulcanization position; after the vulcanization processing, making the bladder remove the vulcanized tire from the vulcanization position to the delivery position; and contracting the bladder at the delivery position for releasing the vulcanized tire from the bladder.

According to the present invention, the bladder for retaining the internal surface of the tire in a predetermined shape during the vulcanization is utilized as loading/unloading means. That is, the bladder operates to load the green tire into the segmented tread mold by transferring the green tire from the tire delivery position to the vulcanization position as well as to return the vulcanized tire to the delivery position by removing the vulcanized tire from the vulcanization position. Thus, it becomes unnecessary to provide any transfer means for performing the loading/unloading of the tire inside the vulcanizer, so that the same can be simplified in construction. Further, when receiving the green tire at the delivery position, the bladder retains the green tire to the predetermined shape which it takes at the time of expansion, in contact with the whole internal surface of the green tire, the bladder loads the green tire into the mold while retaining the predetermined shape, and the bladder retains the internal surface of the tire in the predetermined shape during the vulcanization. This results in precluding bad effects which are accompanied by the prior art loading means for holding the easily deformable green tire at several portions thereof and for loading it into the molds. In the present invention, since the bladder which expands to the predetermined shape at the stage of receiving the green tire at the delivery position supports the green tire equally at the whole region of the internal surface thereof, the accurate forming of the green tire is ensured, so that the tire shape after the vulcanization processing can be retained accurately.

The second invention resides in a tire vulcanizing method in a vertical vulcanizer wherein relative to a lower mold containing a green tire, an upper mold arranged over the lower mold in axial alignment with the same is lowered to combine the upper mold with the lower mold; and wherein a pair of vertically movable bladder operating sleeves are provided for air-tightly binding upper and lower end ring portions of a bladder which is expanded inside the green tire; the method featuring the step of making a single centering shaft pass through centers of the lower mold, the upper mold, the green tire, the bladder and the pair of bladder operating sleeves during a vulcanization so that the vulcanization processing is performed with the single centering shaft centering the pair of bladder operating sleeves relative to the lower mold and the upper mold.

According to the present invention, the vulcanization processing is carried out with the centering shaft centering the pair of bladder operating sleeves relative to the lower mold and the upper mold. The centers of the bladder operating sleeves are aligned by the centering shaft with the centers of the upper mold and the lower mold. As a result, the center of the bladder whose upper and lower end ring portions are bound by the bladder operating sleeves is aligned with the centers of the upper mold and the lower mold. Thus, the bladder can align the center of the green tire with the centers of the upper mold and the lower mold during the vulcanization processing, whereby the tire can be vulcanized coaxially with the upper mold and the lower mold. Therefore, the whole circumferential region of the tire so vulcanized are vulcanized and shaped coaxially with the center of the tire, so that the rotational accuracy of the tire can be heightened.

The third invention resides in the tire vulcanizing method according to the second invention, wherein the bladder is made to be expandable and contractible at a vulcanization position inside a segmented tread mold which constitutes the lower mold to be opened and closed radially in a horizontal plane, and is made to be expandable and contractible also at a tire delivery position which is outside the segmented tread mold to be a predetermined distance upwardly away from the vulcanization position along the axis of the segmented tread mold; the method featuring the steps of expanding the bladder at the delivery position to hold the green tire loaded into the tire delivery position; then making the bladder load the green tire into the segmented tread mold at the vulcanization position; after the vulcanization processing, making the bladder remove the vulcanized tire from the vulcanization position to the delivery position; and making the bladder contract at the delivery position for releasing the vulcanized tire from the bladder.

According to the present invention, the functions and effects of the first invention which are achieved by utilizing the bladder as loading/unloading means are added to the second invention.

The fourth invention resides in a tire vulcanizer, which comprises a vertically extending frame; a lower mold fixedly arranged at a lower position than an approximately mid position of the frame in a vertical direction; an upper mold arranged at al higher position than the mid position of the frame and guided on the frame to be vertically movable in axial alignment with the lower mold and to be vertically positioned by a feed mechanism; a bladder arranged in axial alignment with a mold center axis passing through centers of the lower mold and the upper mold; first and second bladder operating sleeves arranged in approximately axial alignment with the mold center axis to be vertically movable as well as to be horizontally displaceable minutely and respectively air-tightly binding a lower end ring portion and an upper end ring portion of the bladder; bladder positioning mechanisms for independently vertically positioning the first and second bladder operating sleeves; and a centering shaft arranged on the mold center axis to be vertically movable by another feed mechanism and enabled to pass through the upper mold, the bladder, the first and second bladder operating sleeves and the lower mold during a vulcanization for centering the first and second bladder operating sleeves relative to the upper mold and the lower mold.

According to the present invention, the same functions and effects as those of the second invention can be attained.

The fifth invention resides in the tire vulcanizer according to the fourth invention, wherein the bladder positioning mechanisms are able to position the first and second bladder operating sleeves so that the bladder is expanded at the vulcanization position inside the lower mold, and wherein the bladder positioning mechanisms are also able to position the first and second bladder operating sleeves so that the bladder is expanded at the approximately mid position in the vertical direction of the frame, the mid position being spaced upward from the vulcanization position.

According to the present invention, since the bladder is expanded at the vulcanization position and is also expanded at the approximately mid position in the vertical direction of the frame, it can transfer the green tire to the vulcanization position after receiving the same at the mid position and can return the vulcanized tire to the mid position after removing the tire from the molds. Accordingly, the bladder can be utilized as loading/unloading means, whereby the same functions and effects as those of the second invention can be accomplished.

The sixth invention resides in the tire vulcanizer according to the fifth invention, which further comprises a pair of upper and lower bladder expansion control members for being brought into contact respectively with upper and lower side surfaces of the bladder to control the expansion operation and the side surface shape in the expansion state of the bladder and control member positioning feed mechanisms for independently positioning the pair of the bladder expansion control members in the vertical direction.

According to the present invention, when the bladder is expanded at the mid position, the pair of upper and lower bladder expansion control members are brought into contact with the upper and lower side surfaces of the bladder to control the expansion operation of the bladder. Since these bladder expansion control members are able to be positioned by the feed mechanisms, the bladder is controllably expanded inside the tire to be equal upward and downward from the center in the width direction and operates to retain the side surface shape of the bladder in expansion to be equal upward and downward. Thus, the green tire is supported by the bladder at the mid position to retain the vertical symmetry with respect to the center in the width direction, and this vertical symmetry is retained at the vulcanization position during the vulcanization processing. As a consequence, the symmetry of the vulcanized tire with respect to the center in the width direction becomes accurate.

The seventh invention resides in the tire vulcanizer according to the fourth invention, wherein the bladder positioning mechanisms comprise a first bladder operating sleeve feed mechanism arranged at a higher position than the approximately mid position of the frame for vertically feeding the first bladder operating sleeve and a second bladder operating sleeve feed mechanism arranged at a lower position than the approximately mid position of the frame for vertically feeding the second bladder operating sleeve.

According to the present invention, the first bladder operating sleeve feed mechanism and the second bladder operating sleeve feed mechanism are arranged to be separated with the approximately mid position of the frame being as the border. Thus, it can be avoided for the mechanisms to be concentrated on the lower side than the mid position of the frame, so that the maintenance, inspection and overhaul of the vulcanizer become easy.

The eighth invention resides in the tire vulcanizer according to the seventh invention, wherein the first bladder operating sleeve and the first bladder operating sleeve feed mechanism are enabled to be connected to and separated from each other, and wherein connection means is further provided for connecting the first bladder operating sleeve to the first bladder operating sleeve feed mechanism.

According to the present invention, the first bladder operating sleeve and the first bladder operating sleeve feed mechanism are separable as well as connectable by the connection means. Thus, it can be realized to set the green tire to the axial alignment with the bladder, the first and second bladder operating sleeves and the upper and lower molds in the separated state and to take out the tire from the vulcanizer after the vulcanization processing.

The ninth invention resides in the tire vulcanizer according to the seventh or eighth invention, wherein the first and second bladder operating sleeve feed mechanisms are respectively composed of servomotors which are controllable synchronously.

According to the present invention, since the first and second bladder operating sleeve feed mechanisms are respectively composed of servomotors which are controllable synchronously, the bladder in expansion to support the green tire at the approximately mid position of the frame can be transferred to the vulcanization position with the expansion state being retained unchanged by synchronously controlling the both servomotors. Thus, it does not occur to change the expansion state of the bladder during the transfer operation and hence, to deform the green tire held by the bladder from the shape bound by the bladder, so that it can be realized to accurately retain the shape of the tire after the vulcanization processing.

The tenth invention resides in the tire vulcanizer according to either one of the fourth through ninth inventions, wherein there is provided a movable frame arranged at a higher position than the approximately mid position of the frame and guided to be vertically movable on the frame; wherein the upper mold is fixedly supported on the movable frame; and wherein the centering shaft is provided with a flange portion which is brought into contact with an upper surface of the movable frame when a lower end portion of the centering shaft is secured to the frame not to be upwardly movable relative to the frame with itself passing through the lower mold.

According to the present invention, since the centering shaft brings the flange portion provided thereon into contact with the back surface of the movable frame mounting and supporting the upper mold thereon when the lower end portion of the centering shaft is secured to the frame not to be upwardly movable relative to the frame with itself passing through the lower mold, the upper mold is prevented from being dislocated from the state of accurate combination with the lower mold due to a pressure increase inside the molds during the vulcanization processing. Thus, any side surface region of the tire formed by the upper mold is prevented from varying from a regular shape, so that the tire after vulcanization processing becomes accurate.

The eleventh invention resides in the tire vulcanizer according to any one of the fifth through tenth inventions, wherein the lower mold is composed of a segmented tread mold including a plurality of mold segments which are guided to be radially movable in a horizontal plane and a lower sidewall mold for closing the lower side surface of the segmented tread mold and wherein the upper mold is composed of an upper sidewall mold for closing an upper side surface of the segmented tread mold.

According to the present invention, since the segmented tread mold is enabled to open radially in the horizontal plane, the green tire supported by the bladder remaining in the expanded state can be loaded, without being deformed, into the segmented tread mold being in the open state, and thus, the green tire accurately supported by the bladder at the approximately mid position on the frame can be put into the vulcanization processing as the accurate support state is retained as it is. Therefore, it can be realized to perform the loading into the segmented tread mold with the retention of the centering state, so that it is possible to manufacture the tires which are more accurate than those manufactured in the prior art method wherein such centering is intended to be done within the segmented tread mold.

PREFERRED EMBODIMENT TO PRACTICE THE INVENTION

Figure 1:
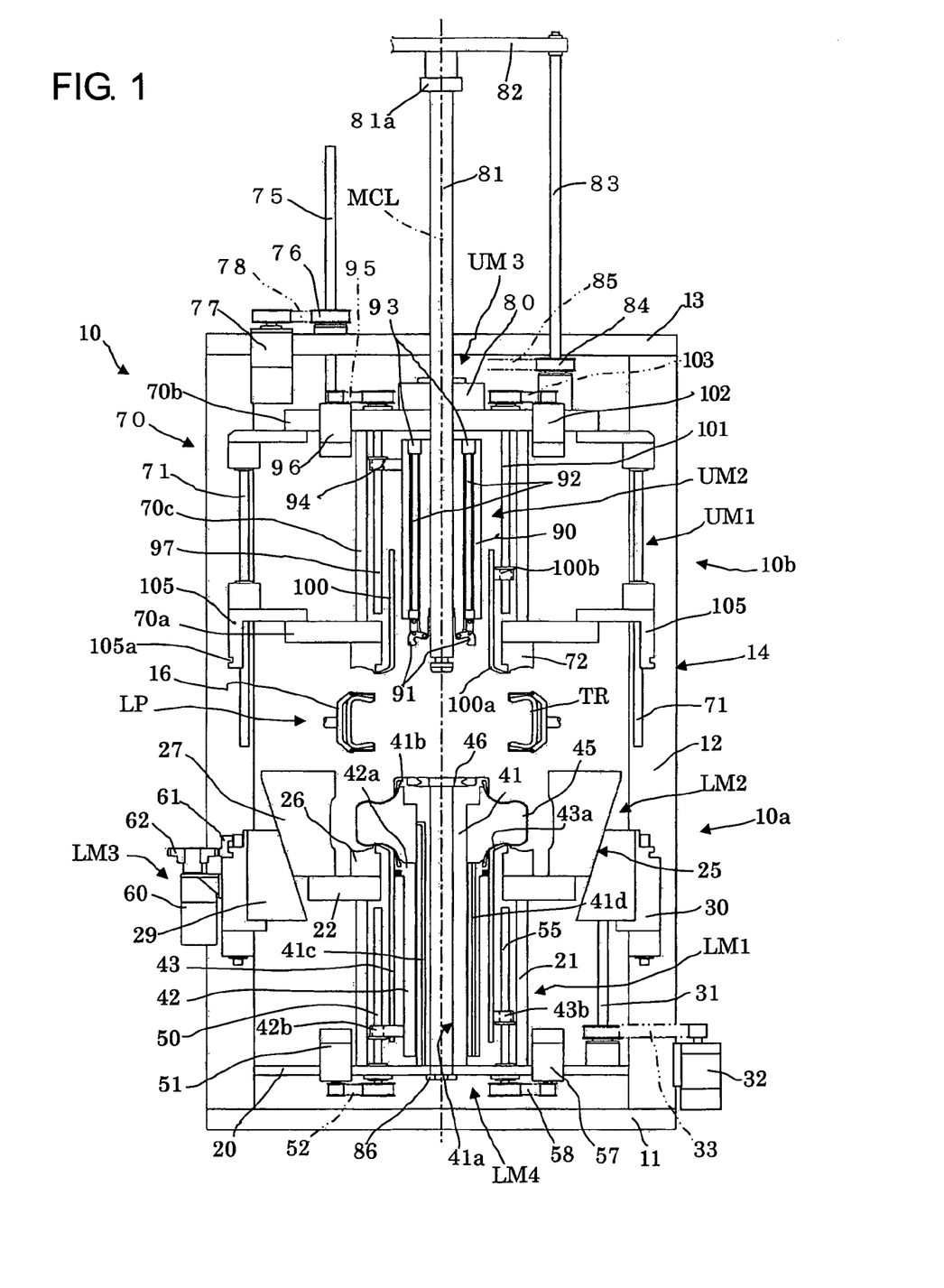
FIG. 1 is a longitudinal sectional view of a vulcanizer in one embodiment according to the present invention wherein the apparatus is in an original position.

Hereafter, a vulcanizer according to the present invention will be described with reference to the accompanying drawings. FIG. 1 shows a longitudinal sectional view of a vertical vulcanizer 10. In FIG. 1, numeral 11 denotes a base plate of a circular or rectangular shape as viewed downward, and on the base plate 11, four main columns 12 including two non-illustrated columns are upstanding at four corners of an imaginary square. These four columns 12 are connected by a top plate 13 to each other, whereby the base plate 11, the columns 12 and the top plate 13 constitute a frame elongated vertically like a rectangular parallelepiped.

A loading/unloading position LP at which a transfer device 16 loads and unloads a green tire to be vulcanized is defined at an approximately mid portion in the vertical direction of the main columns 12. The vulcanizer 10 has all the mechanisms which with respect to the loading/unloading position LP as its center, are separated into a lower mechanism section 10a arranged on the lower side and an upper mechanism section 10b on the upper side, so that the concentration of the mechanical sections to the lower side or the upper side of the column 12 is avoided to ensure the ease to maintain, inspect and overhaul.

The lower mechanism section 10a is composed mainly of a mold supporting mechanism LM1, an opening/closing mechanism LM2 for a segmented tread mold, an upper sidewall mold locking mechanism LM3 and a bladder main operating mechanism LM4. On the other hand, the upper mechanism section 10b is composed mainly of a supporting and opening/closing mechanism UM1, a bladder sub operating mechanism UM2 and a centering mechanism UM3.

A mold base member 20 constituting the mold supporting mechanism LM1 is secured to the columns 12. The mold base member 20 is composed of a vertically extending cylindrical portion 21 and a mold support table 22 of an annular disc shape secured to the top end of the cylindrical portion 21. A lower mold assembly 25 is mounted on the top of the mold support table 22. The lower mold assembly 25 is composed of a lower sidewall mold 26 of a generally annular shape which is secured in coaxial alignment with the cylindrical portion 21 and a mold center axis MCL extending in the machine center and a segmented tread mold 27 including a plurality (e.g., eight) of mold segments which are arranged on the mold support table 22 about the mold center axis MCL at an equi-angular interval and which are movable to advance or retract in the radial directions. Each segment of the segmented tread mold 27 is of the arc shape having an arc length of a predetermined angle (e.g., 45 degrees in this particular embodiment having the eight segments). The internal surface of each mold segment has formed a tread forming surface with a predetermined tread pattern at the mid portion in the vertical direction and also has formed, at its opposite end edge portions in the vertical direction, arc surfaces which can be closely fitted respectively on the external surfaces of the lower sidewall mold 26 and an upper sidewall mold 72 referred to later.

The opening/closing mechanism LM2 for the segmented tread mold 27 includes a radial direction guiding mechanism (not shown) for supporting the segmented tread mold 27 not to be movable relative to the support table 22 in the vertical direction and for radially guiding lower surfaces of the mold segments by means of dovetail guides. The outer surface of each segment of the segmented tread mold 27 is made to be a tapered surface which becomes smaller in diameter toward the lower side, and the circumferential mid portion of each tapered surface is engaged with the internal surface of a mold clamping ring member 29 through a dovetail guide. The mold clamping ring member 29 is securely fitted in a ring holder 30 of an annular shape which is vertically guided along linear guides 30a (refer to FIG. 2) respectively secured to the columns 12 and is vertically moved by a screw shaft 31 rotatably carried on the mold base member 20. The screw shaft 31 is rotationally driven by a servomotor 32 through a pulley-belt mechanism 33 to move the mold clamping ring member 29 up and down, whereby the segmented tread mold 27 is radially moved to be opened and closed. The servomotor 32, the screw shaft 31 and the mold clamping ring member 29 constitute an opening/closing drive mechanism for the segmented tread mold 27 constituting the lower mold.

The bladder main operating mechanism LM4 is provided on the center of the cylindrical member 21 and is composed of a first bladder operating sleeve 41 arranged in coaxial alignment with the mold center axis MCL, a second bladder operating sleeve 42 fitted on the outer surface of the sleeve 41 and a bladder expansion control sleeve 43 fitted on the outer surface of the sleeve 42. The first bladder operating sleeve 41 has formed on its center axis portion a through hole 41a through which a centering shaft 81 referred to later passes in close fitting engagement. The first bladder operating sleeve 41 is provided at its upper end portion with a binding portion 41b which air-tightly binds an upper end ring portion of the bladder 45, and is further provided a gripped ring 46 secured to the center of its upper end. Further, the first bladder operating sleeve 41 has formed therein a supply passage 41c and an exhaust passage 41d for gas, and these passages 41c and 41d open into the bladder 45 at their upper ends and are in fluid communication with a gas supply device (not shown) at their lower ends. The first bladder operating sleeve 41 is movable up and down with the gripped ring 46 being gripped by the bladder sub operating mechanism UM2 incorporated in the upper half mechanism section 10b referred to later.

The second bladder operating sleeve 42 air-tightly binds the lower end ring portion of the bladder 45 at an upper end flange portion 42a thereof. The diameter of the biding portion for the lower end ring portion is set to be equal to the diameter of the binding portion 41b of the upper end ring portion. Nuts 42b are secured to the lower end portion of the second bladder operating sleeve 42 and are in screw-engagement with screw shafts 50 which are rotatably supported to extend vertically on the mold base member 20. The screw shafts 50 are rotatable by a servomotor 51 attached to the mold base member 20, through a pulley-belt mechanism 52, so that the second bladder operating sleeve 42 and hence, the lower end ring portion of the bladder 45 can be adjusted to be positioned vertically. Thus, in cooperation with the position adjusting operation of the upper end ring portion of the bladder 45 performed by the bladder sub operating mechanism UM2, the bladder 45 is able to be moved between a vulcanization position (FIG. 2) where it aligns with the segmented tread mold 27 in height and a delivery position (FIG. 3(D)) where it aligns with the loading/unloading position LP in height. The servomotor 51, the pulley-belt mechanism 52, the nuts 42b and the screw shafts 50 constitute a second bladder operating sleeve feed mechanism for independently feeding the second bladder operating sleeve 42 up and down.

The bladder expansion control sleeve 43 as bladder expansion control member has formed at its upper end a bladder side surface restraining portion 43a opening like a trumpet and has nuts 43b secured to its lower end. Screw shafts 55 in screw-engagement with the nuts 43b are rotatably supported on the mold base member 20 to extend vertically and are rotatable by a servomotor 57 attached to the mold base member 20 through a pulley-belt mechanism 58, so that the bladder expansion control sleeve 43 and hence, the bladder side surface restraining portion 43a are able to be adjusted vertically. The servomotor 57, the pulley-belt mechanism 58, the nuts 43b and the screw shafts 55 constitute a control member positioning feed mechanism for independently positioning the bladder expansion control sleeve 43 in the vertical direction. Thus, the bladder side surface restraining portion 43a is operable so that upon expansion of the bladder 45, the bladder side surface restraining portion 43a is pressured on the lower side surface portion of the bladder 45 thereby to urge the bladder 45 to expand first in the radial outward directions and so that when it is confirmed by, e.g., the time-up operation of a timer that the radial outward expansion is ensured, the bladder side surface restraining portion 43a is retracted from a push-up position at the lower side surface portion of the bladder 45 to permit the lower side surface portion to expand.

Although being illustrated as one screw shaft only in the drawings, the screw shafts 55 are of the plural number which are arranged at an equiangular interval in the circumferential direction, and through the resilient deformation of these plural screw shafts 55, the bladder expansion control sleeve 43 is displaceable minutely within the horizontal plane thereby to be arranged in approximately coaxial alignment with the mold center axis MCL. The second bladder operating sleeve 42 is fitted at its upper end external surface in the internal surface of the bladder expansion control sleeve 43 to be relatively movable in the axial direction and is fitted at its internal surface on the external surface of the first bladder operating sleeve 41 to be relatively movable in the axial direction. Although being illustrated as one screw shaft only in the drawings, the screw shafts 50 for the second bladder operating sleeve 42 are of the plural number which are arranged at an equiangular interval in the circumferential direction, and through the resilient deformation of these plural screw shafts 50, the second bladder operating sleeve 42 is displaceable minutely within the horizontal plane thereby to be arranged in approximately coaxial alignment with the mold center axis MCL. Thus, when the centering shaft 81 is made to pass through the through hole 41a of the first bladder operating sleeve 41 in close fitting engagement, it causes the first bladder operating sleeve 41, the second bladder operating sleeve 42 and the bladder expansion control sleeve 43 to be displaced minutely and hence, to be coaxially centered on the mold center axis MCL.

The upper sidewall mold locking mechanism LM3 is composed of a reduction gear motor 60 mounted on the ring holder 30, a clamping member 61 in the form of an annular shape with its rotational center on the mold center axis MCL and a pinion 62 meshing with a gear formed on the circumferential surface of the clamping member 61 and rotatable by the motor 60. The clamping member 61 is formed to take a U-like cross section and is fitted in an annular groove of the ring holder 30 at a lower end annular protruding portion thereof and thus, is supported to be rotatable but not to be vertically movable relative to the ring holder 30. An upper end annular protruding portion of the clamping member 61 has plural cutouts (not shown) of a predetermined arc width formed at an equiangular interval. When positioned to an unclamping angular position, the clamping member 61 permits lower end engaging portions of plural engaging members 105, which are secured to an upper sidewall mold support table referred to later, to enter therein through the cutouts. However, when at a clamping position turned a predetermined angle from the unclamping angular position, the clamping member 61 comes into engagements with grooves formed on the lower end engaging portions of the engaging members 105 thereby to sandwich the ring holder 30 and the engaging members 105 from the opposite sides in the vertical direction, so that it can be ensured to perform the pressuring closing operation of the upper sidewall mold on the mold assembly 25.

Next, the upper half mechanism section 10b will be described. The support and opening/closing mechanism UM1 for the upper sidewall mold constituting an upper mold includes a movable frame 70, which is vertically movable along linear guide rails 71 laid on the columns 12. The movable frame 70 is composed of a support table 70a on the lower side supporting the upper sidewall mold 72, an upper plate 70b on the upper side and a connection cylinder 70c connected bodily with both of these members and arranged coaxially of the mold center axis MCL. The upper plate 70b has secured thereto the lower end portion of a screw shaft 75 extending vertically, and the upper end portion of the screw shaft 75 extends to pass through the top plate 13 and is screw-engaged with a nut 76 which is rotatably carried on the upper surface of the top plate 13 through a thrust bearing (not shown). The nut 76 is in driving connection with a servomotor 77 mounted on the top plate 13, through a pulley-belt mechanism 78. Thus, by the operation of the servomotor 77, the movable frame 70 is able to be vertically positioned together with the upper sidewall mold 72, so that the upper sidewall mold 72 can be brought into combination with the mold assembly 25.

The support table 70a has the upper sidewall mold 72 secured at its lower end coaxially with the mold center axis MCL. A guide cylinder 80 is secured on the upper surface of the upper plate 70b coaxially with the mold center axis MCL, and the centering shaft 81 guided by the guide cylinder 80 is guided to be vertically movable on the mold center axis MCL. The centering shaft 81 constitutes a component of a centering mechanism UM3 and has secured to its upper end a cross bar 82, whose one end is secured to the upper end of a screw shaft 83. The screw shaft 83 extends vertically and is screw-engaged with a nut 84, which is supported on the upper plate 70b through a thrust bearing (not shown) not to be relatively movable in the vertical direction, but only to be freely rotatable. The nut 84 is drivingly rotatably by a servomotor (not shown) mounted on the upper plate 70b, through a pulley-belt mechanism 85. Thus, when the servomotor (not shown) is driven, the centering shaft 81 is movable between an upper position (non-centering/disconnecting position) where it makes its lower end remain inside the upper sidewall mold 72, and a lowered position (centering/connecting position) where it makes its lower end pass through the mold assembly 25, the through hole 41a of the first bladder operating sleeve 41 and the mold base member 20.

Figure 2:
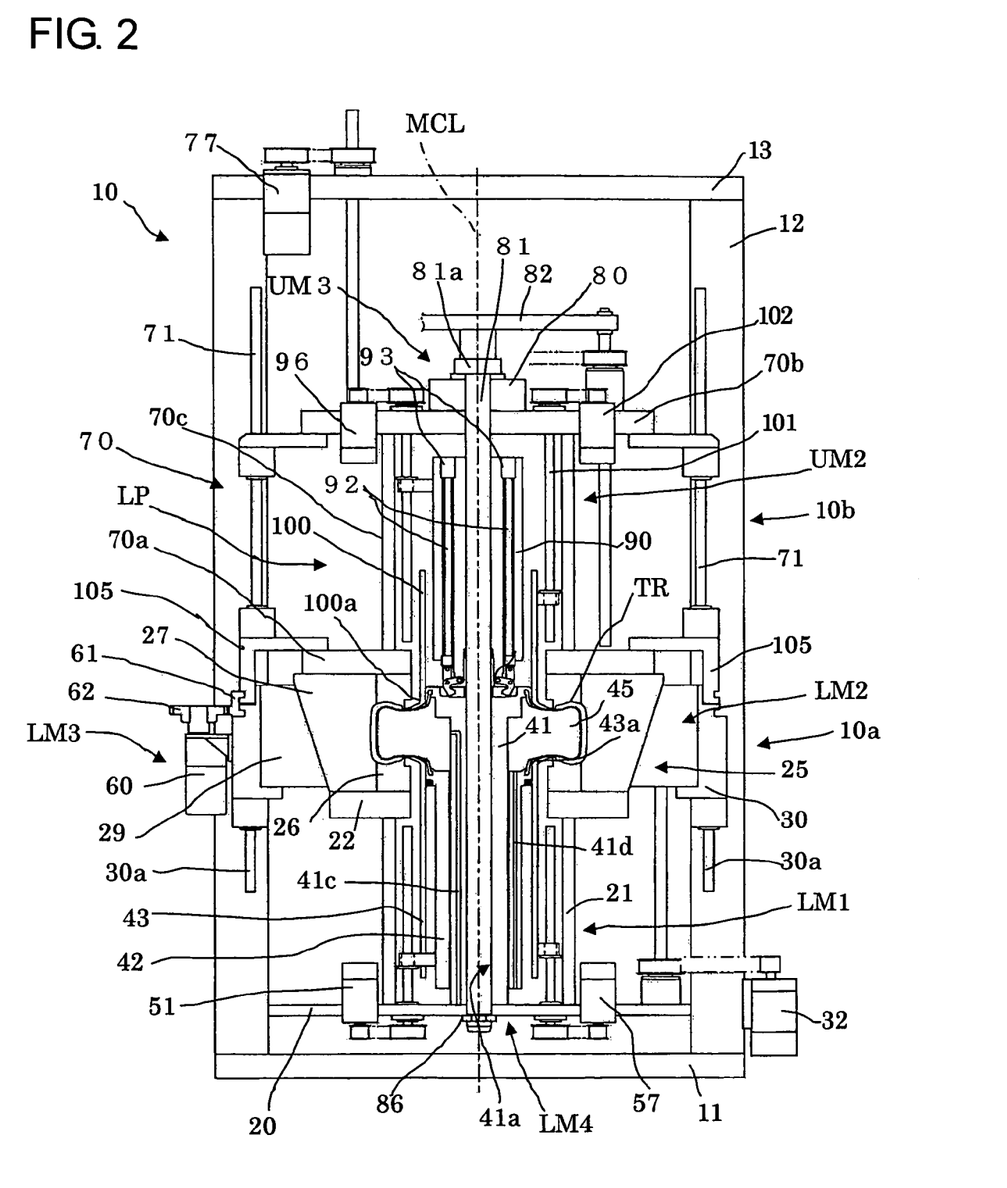
FIG. 2 is a longitudinal sectional view of the vulcanizer in the embodiment wherein the apparatus is in the state of a vulcanization operation.

As shown in FIG. 2, when the upper sidewall mold 72 is advanced to a lowered portion where it is combined with the mold assembly 25, an upper end flange portion 81a of the centering shaft 81 positioned to the lowered position is brought into contact with the upper end surface of the guide cylinder 80, while the lower end portion of the centering shaft 81 protrudes from the lower surface of the mold base member 20. By inserting a yoke wedge member 86 into two cutout grooves formed on the protruding portion, the centering shaft 81 being locked not to move upward relative to the frame 14 serves to push the upper or back surface of the movable frame 70 against the mold base member 20 and centers the mold assembly 25, the upper sidewall mold 72, the first bladder operating sleeve 41, the second bladder operating sleeve 42 and the bladder expansion control sleeve 43 to bring these members into coaxial alignment with the mold center axis MCL. With this, the upper sidewall mold 72 is prevented from separating from the upper surface of the segmented tread mold 27 due to a pressure increase inside the mold assembly 25.

Further, a connection cylinder 90 constituting the bladder sub operating mechanism UM2 is arranged coaxially with the connection cylinder 70c and is fitted at its center through hole on the external surface of the centering shaft 81 to be movable relative thereto in the axial direction. The connection cylinder 90 carries at two diametrically opposite positions a pair of connection claws 91 to be pivotable for opening and closing motions, and mid portions of these connection claws 91 are in pivotable connections with pilot rods 92 through links, respectively. The upper ends of the pilot rods 92 are connected to pistons of a pair of air actuators 93 provided at the upper end portion of the connection cylinder 90, so that the connection claws 91 are able to be opened and closed selectively upon operations of the air actuators 93. A nut 94 is fixed on the upper end of the connection cylinder 90 and is screw-engaged with a screw shaft 97 which is rotatably by a servomotor 96 fixed on the upper plate 70b, through a pulley-belt mechanism 95. The screw shaft 97 is supported on the upper plate 70b to be rotatable only and is resiliently deformable minutely to permit the connection cylinder 90 to yield to the centering shaft 81. The servomotor 96, the pulley-belt mechanism 95, the screw shaft 97 and the nut 94 constitute a first bladder operating sleeve feed mechanism for vertically feeding the first bladder operating sleeve 41 through the connection cylinder 90.

When the servomotor 96 is operated, it becomes possible to make the connection cylinder 90 go down relative to the movable frame 70 and then, to make the gripped ring 46 grasped when the connection claws 91 are brought into closing operation at the lowered position. Thus, the first bladder operating sleeve 41 is bodily connected to the connection cylinder 90, and then by moving the connection cylinder 90 upward by the operation of the servomotor 96 and, synchronously with this motion, by moving the second bladder operating sleeve 42 upward by the operation of the servomotor 51, the bladder 45 can be moved from the vulcanization position to the delivery position LP higher than the vulcanization position with itself being kept in an expansion state. Accordingly, the bladder 45 is operable as loading/removing device for the tire TR which transfers a green tire to be next vulcanized from the delivery position LP to the vulcanization position and which removes the vulcanized tire TR from the vulcanized position to return it to the delivery position LP.

Further, another bladder expansion control sleeve 100 with the lower end portion taking the form of a trumpet is arranged around the connection cylinder 90, and this sleeve 100 functioning as a bladder expansion control member has nuts 100b secured to the upper end thereof. The nuts 100b and screw shafts 101 screw-engaged therewith are plural to be arranged at an equiangular interval in the circumferential direction, and the screw shafts 101 extend from the upper plate 70b to be rotatably supported. By rotating the screw shafts 101 through a pulley-belt mechanism 103 by a servomotor 102 mounted on the upper plate 70b, the bladder expansion control sleeve 100 and hence, a bladder side surface restraining portion 100a thereof are adjustable in vertical position. Thus, when the bladder 45 operates to expand, the side surface restraining portion 100a serves for the upper side surface portion of the bladder 45 in the same manner as the foregoing bladder side surface restraining portion 43a does for the lower side surface portion. The servomotor 102, the pulley-belt mechanism 103, the screw shafts 101 and the nuts 100b constitute a control member positioning feed mechanism for independently positioning the bladder expansion control sleeve 100 in the vertical direction.

Next, the operation of the vulcanizer in the embodiment as constructed above will be described. In the original position state shown in FIG. 1, an unvulcanized green tire whose circumferential surface is held by the transfer device 16 is loaded into the loading/unloading position LP which is coaxial with the mold center axis MCL. Upon completion of the loading operation, the centering shaft 81 is moved down as the screw shaft 83 is lowered by rotating the nut 84 by the servomotor (not shown) and inserts its lower end portion into the through hole 41a of the first bladder operating sleeve 41 until stopped at an intermediate lowered position where its makes the lower end portion reach an intermediate position in the vertical direction. Thus, the first and second bladder operating sleeves 41, 42 and the bladder expansion control sleeve 43 are displaced minutely within the horizontal plane through the resilient deformations of the screw shafts 50, 55 supporting these sleeves and are brought into coaxial alignment with the mold center axis MCL as a result of being centered by the centering shaft 81.

Figure 3A:
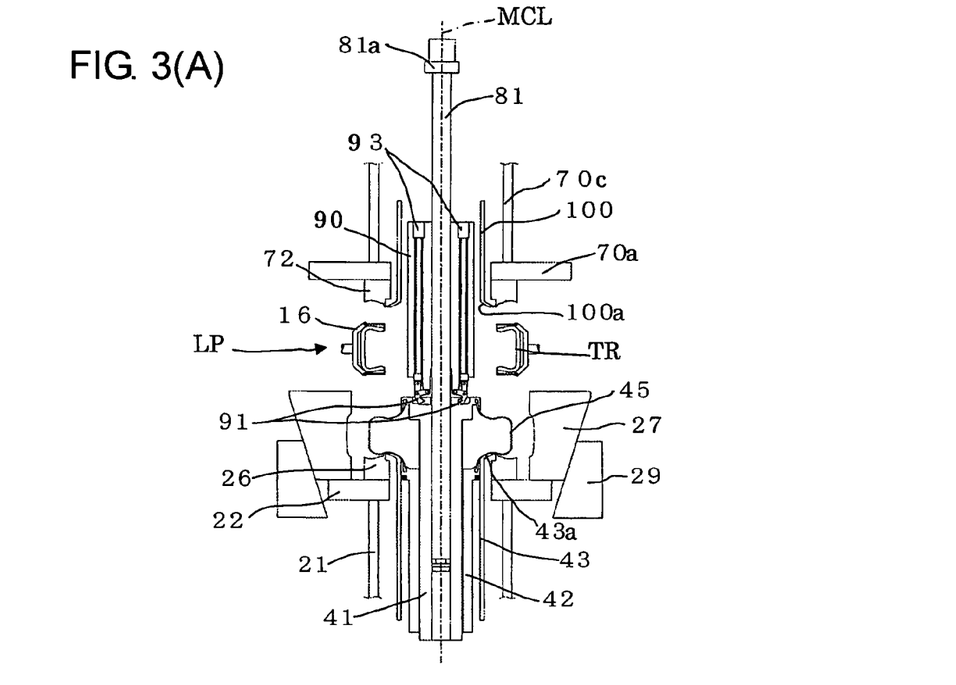
FIG. 3(A) is a fragmentary longitudinal sectional view of the embodiment showing an early stage of a loading operation in which a bladder supports a green tire held at a loading/unloading position LP to load the green tire into a segmented tread mold and a final stage of a removal operation in which the bladder removes the tire from the mold after vulcanization.
Figure 3B:
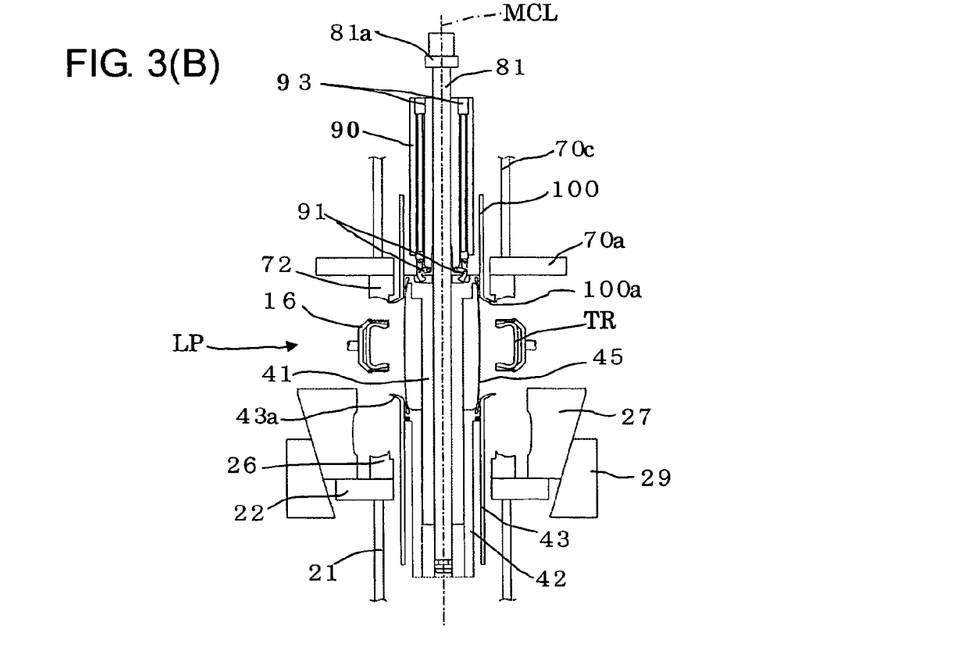
FIG. 3(B) is a fragmentary longitudinal sectional view of the embodiment showing another stage in the loading and removal operations.

Slightly behind the downward operation of the centering shaft 81, the connection cylinder 90 is lowered to its lowered position by the operation of the servomotor 96 to bring the pair of connection claws 91 into alignment in height with an annular V-groove of the gripped ring 46. The subsequent operations of the air actuators 93 cause the connection claws 91 to be closed, whereby the first bladder operating sleeve 41 is connected bodily with the connection cylinder 90, as shown in FIG. 3(A). Then, as shown in FIG. 3(B), the connection cylinder 90 is moved by the reverse rotation of the servomotor 96 upward to the original position, whereby the bladder 45 is caused to pass through the center of the green tire TR with itself being extended almost cylindrically. Slightly behind this upward movement, the second bladder operating sleeve 42 and the bladder expansion control sleeve 43 are moved upward almost bodily by the operations of the servomotors 51, 57 to elevate the side surface restraining portion 43a at the upper end of the bladder expansion control sleeve 43 to a position shown in FIG. 3(B) where the side surface restraining portion 43a is located to be symmetrical to the side surface restraining portion 100a at the lower end of the bladder expansion control sleeve 100 with respect to the center in the width direction of the green tire TR.

Figure 3C:
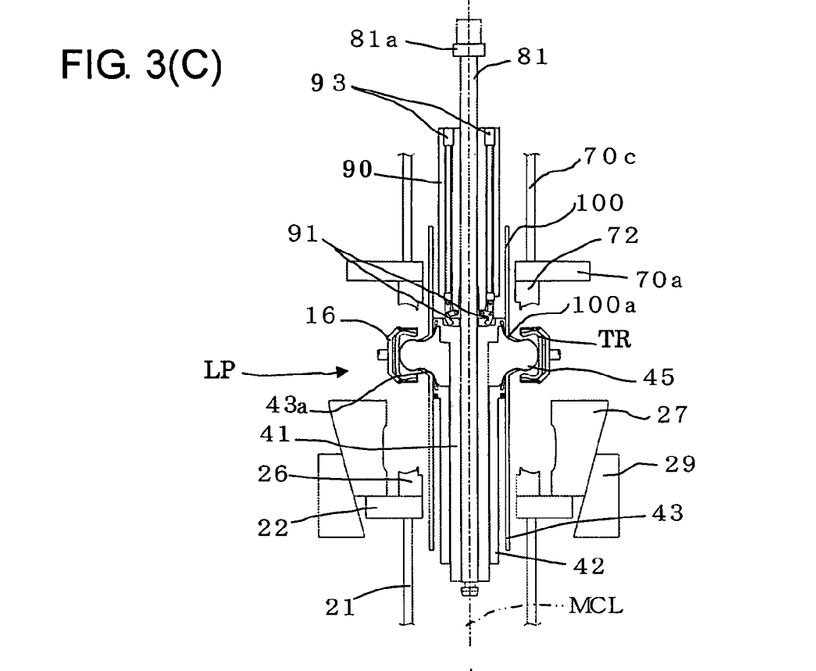
FIG. 3(C) is a fragmentary longitudinal sectional view of the embodiment showing the process of expanding the bladder at still another stage in the loading and removal operations.

Subsequently, the pair of the second bladder operating sleeve 42 and the bladder expansion control sleeve 43 on the lower side and the pair of the first bladder operating sleeve 41 and the bladder expansion control sleeve 100 on the upper side are synchronously fed to come close to each other toward the center in the width direction of the green tire TR. As shown in FIG. 3(C), at this advanced positions, the side surface restraining portion 43a of the bladder expansion control sleeve 43 and the side surface restraining portion 100a of the bladder expansion control sleeve 100 are approached to the inside of the green tire TR, that is, to the inside respectively beyond upper and lower bead portions of the green tire TR. At this stopped positions, a positional relation is made so that the side surface restraining portion 100a protrudes from the binding portion 41b of the first bladder operating sleeve 41 connected to the connection cylinder 90, while the side surface restraining portion 43a slightly protrudes from the binding portion 42a of the second bladder operating sleeve 42.

Figure 3D:
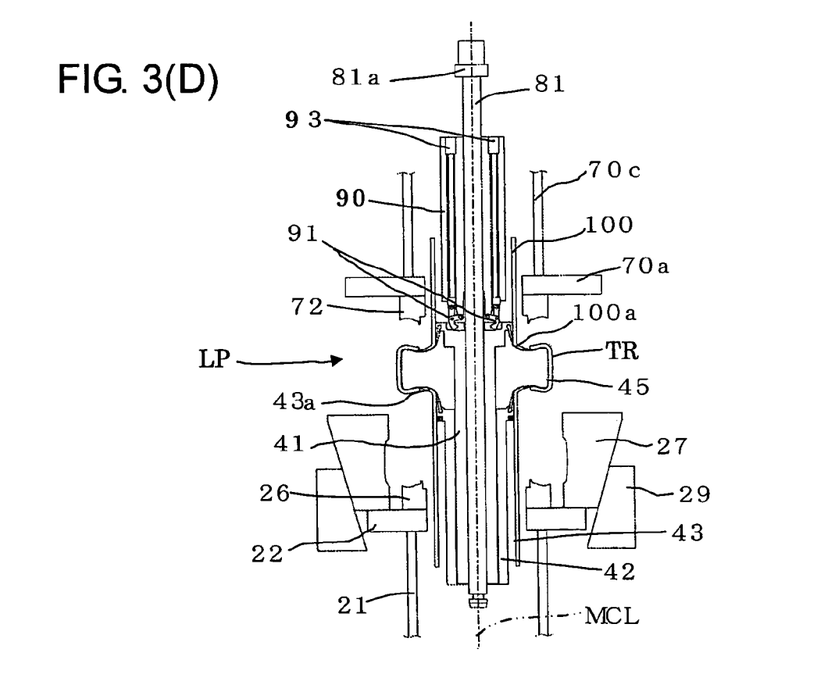
FIG. 3(D) is a fragmentary longitudinal sectional view of the embodiment showing the state of the bladder holding the green tire at a further advanced stage in the loading and removal operations.

Thereafter, compressed air is led into the bladder 45, which thus begins to expand gradually outward in the radial directions at the center position in the width direction of the green tire TR. At the early stage of the expansion operation of the bladder 45, the pair of the second bladder operating sleeve 42 and the bladder expansion control sleeve 43 on the lower side and the pair of the first bladder operating sleeve 41 and the bladder expansion control sleeve 100 on the upper side are held at respective positions shown in FIG. 3(C). Therefore, the bladder 45 begins to expand within a space which is narrowed by the upper and lower bladder side surface restraining portions 100a, 43a, thereby to expand out from the center in the width direction of the green tire TR and begins to come contact to the center in the width direction on the internal surface of the tread portion of the green tire TR. Then, by controlling the servomotors 102, 57, the positions of the bladder expansion control sleeve 100 and the bladder expansion control sleeve 43 are controlled to go away gradually from each other, so that the bladder side surface restraining portions 100a, 43a are brought into alignment in height respectively with the upper and lower bead portions of the green tire TR, as shown in FIG. 3(D). As a consequence, the bladder 45 then comes to expand in the width direction (in the vertical direction in this case), so that it comes to contact correctly to the inner circumferential surface of the green tire TR at its whole surface.

That is, the positions of the bladder expansion control sleeve 100 and the bladder expansion control sleeve 43 are controlled as the bladder 45 expands out in this manner, so that the symmetry in the vertical direction of each of the bladder 45 and the green tire TR can be ensured. Further, by supporting the internal surface of the green tire by the bladder 45 which has been ensured to be coaxial with the mold center axis MCL, it is ensured that the green tire being supported by the bladder 45 becomes coaxial precisely with the mold center axis MCL. In addition, in the apparatus in the present embodiment, since the diameter of the binding portion 41b which air-tightly binds the upper end ring portion of the bladder 45 is set to be equal to the diameter of the binding portion 42a which air-tightly binds the lower end ring portion, the bladder 45 is prevented from expanding as it is deviated from the center in the width direction of the green tire TR, but is enabled to expand symmetrically at its upper and lower portions. Therefore, the bladder 45 can form and hold the green tire TR to be further precisely symmetrical with respect to the center in the width direction.

After the green tire TR is held by the bladder 45 to be symmetrical in the width direction as well as in the radial directions, the transfer device 16 releases the green tire TR and leaves the vulcanizer 10 outside. Thereafter, the movable frame 70 on the upper side and the pair of the second bladder operating sleeve 42 and the bladder expansion control sleeve 43 on the lower side are bodily moved down by synchronously controlling the servomotors 77, 51 and 57. Therefore, the pair of the first bladder operating sleeve 41 and the bladder expansion control sleeve 100 and the pair of the second bladder operating sleeve 42 and the bladder expansion control sleeve 43 are moved downward as if these four members were one body with the relative movements among these four members being kept unchanged, whereby the green tire TR is lowered to the vulcanization position where the center in the width direction of the green tire TR comes to alignment in height with the center in the width direction (vertical direction) of the segmented tread mold 27 while being held by the bladder 45. In this case, since the segmented tread mold 27 remains at its expanded position where it is opened radially, the green tire TR is led to the vulcanization position without interfering with the segmented tread mold 27. When the green tire TR reaches the vulcanization position, synchronous feedings are terminated regarding the movable frame 70 on the upper side and the pair of the second bladder operating sleeve 42 and the bladder expansion control sleeve 43 on the lower side. In other words, the synchronous controls of the servomotors 77, 51 and 57 are terminated, whereby the lowered movements of the second bladder operating sleeve 42 and the bladder expansion control sleeve 43 are stopped upon the discontinuations in operation of the servomotors 51, 57.

At this stop state, the support table 70a keeps its lower surface still separated from the upper surface of the segmented tread mold 27. Therefore, by resuming the operation of the servomotor 77, the movable frame 70 is thereafter lowered to a position where it makes the lower surface of the support table 70a contact closely with the upper surface of the segmented tread mold 27 for a mold closing operation. In the course of this mold closing operation, the servomotors 96 and 102 are reversely operated in synchronized relation with the operation of the servomotor 77, whereby the connection cylinder 90 and the bladder expansion control sleeve 100 are moved upward relative to the movable frame 70 at the same speed and by the same amount as those in the downward operation of the movable frame 70. Thus, the connection cylinder 90 and the first bladder operating sleeve 41 and the bladder expansion control sleeve 100 which are connected thereto remain unchanged in their vertical positions. This keeps unchanged the shape of the bladder 45 being in the expansion state, whereby the green tire TR can be held correctly at the vulcanization position with its center in the width direction being aligned with the center in the width direction (vertical direction) of the segmented tread mold 27 and its center in the radial direction being made to be coaxial with the mold center axis MCL and hence, with the segmented tread mold 27.

In this way, the movable frame 70 is lowered to lower the upper sidewall mold 72 to a mold assembling position at the lowered end position. At this time, the centering shaft 81 is lowered by the downward operation of the movable frame 70 together with the same to make its lower end portion protrude from the lower end surface of the mold base member 20. The yoke wedge member 86 operable by the air actuator (not shown) is brought into engagements with the two face grooves formed on the protruding portion, and the lower end of the centering shaft 81 is joined bodily with the mold base member 20 and hence, with the frame 14. In this state, the upper flange portion 81a of the centering shaft 81 is kept in contact with the upper surface of the guide cylinder 80, that is, the back surface of the movable frame 70, so that the movable frame 70 is prevented from retracting upward. Therefore, in this state, the centering shaft 81 serves to fix the position of the upper mechanism section 10b of the vulcanizer 10 relative to the lower mechanism section 10a, wherein this fixed relation includes the relative position of the upper sidewall mold 72 to the lower sidewall mold 26.

Then, the screw shaft 31 is rotated by the operation of the servomotor 32, and the ring holder 30 together with the mold clamping ring member 29 is elevated along the columns 12. Thus, the eight segments of the segmented tread mold 27 are moved from the open position shown in FIG. 1 radially inward to the closed position shown in FIG. 2 while being slidden at their upper and lower surfaces along the lower surface of the support table 70a and the upper surface of the mold support table 22. Then, each segment of the segmented tread mold 27 is stopped so that the arc surfaces at the upper and lower edge portions thereof are closely fitted respectively on the circumferential surfaces of the upper sidewall mold 72 and the lower sidewall mold 26.

When the movable frame 70 is moved to the lower end as mentioned earlier, the lower end portions of the plural (e.g., eight) engaging members 105 which are arranged on the support table 70a at the equiangular interval have passed through the cutouts (not shown) on the upper end annular protruding portion of the annular clamping member 61 to enter into the U-shape space in the clamping member 61. Therefore, when the motor 61 is then operated to rotate the clamping member 61 a predetermined angle through the pinion 62, the upper end annular protruding portion of the annular clamping member 61 comes into fitting engagements with the grooves 105a of the engaging members 105, whereby the movable frame 70 and the ring holder 30 are clamped on each other through the engaging members 105 and the clamping member 61.

In this state, heated gas (e.g., steam or heated inert gas) is supplied into the bladder 45 through the supply passage 41c formed in the first bladder operating sleeve 41, simultaneously with which the pressurized air supplied previously is discharged from the exhaust passage 41d to exchange the gas inside the bladder 45 with the heated gas. It is preferable that the exchange of the gases is performed not to lower the inside pressure while detecting the pressure change within the bladder 45. Thus, the green tire TR is pressured and heated through the bladder 45 and is vulcanized by the cooperation of the bladder 45 with the molds 27, 26 and 72 on the outside.

After the vulcanization processing is performed through a predetermined period of time, the motor 60 is reversely operated to release the movable frame 70 and the ring holder 30 from the clamping operation by the clamping member 61, and the yoke wedge member 86 is released by the reverse operation of the air actuator (not shown) from the engagement with the lower end portion of the centering shaft 81. Further, the reverse operation of the servomotor 32 causes the ring holder 30 to be lowered, whereby the segmented tread mold 27 is returned to its open position outward in the radial directions to become ready for the removal operation of the vulcanized tire TR.

Upon completion of returning the segmented tread mold 27 to the open position, the movable frame 70, the centering shaft 81, the connection cylinder 90 and the bladder expansion control sleeve 100 and the first bladder operating sleeve 41 remaining connected bodily with the connection cylinder 90 are elevated by the reverse operation of the servomotor 77, and the second bladder operating sleeve 42 and the bladder expansion control sleeve 43 are elevated bodily by the synchronized reverse rotations of the servomotors 51 and 57. At this time, the elevation speed of the movable frame 70 is set to a faster speed than (preferably, double) the elevation speed of the second bladder operating sleeve 42 and the bladder expansion control sleeve 43, whereas the servomotors 96 and 102 are operated to lower the connection cylinder 90 and the bladder expansion control sleeve 100 relative to the movable frame 70 at the same speed as the elevation speed of the second bladder operating sleeve 42 and the bladder expansion control sleeve 43.

As a result, the bladder 45 can remove the vulcanized tire TR upward from the molds so that the vulcanized tire TR held thereby is separated from the upper sidewall mold 72 at the same speed as is separated from the lower sidewall mold 26, and at the same time, the deformation of the bladder 45 is prevented by keeping unchanged the relative position of the pair of the first bladder operating sleeve 41 and the bladder expansion control sleeve 100 on the upper side to the pair of the second bladder operating sleeve 42 and the bladder expansion control sleeve 43. Therefore, it can be realized to perform the removal operation from the upper and lower sidewall molds 72, 26 evenly and smoothly, so that the symmetry of the vulcanized tire TR between the upper and lower halves thereof can be maintained accurately.

Further, the movable frame 70 is retracted to the elevated original position shown in FIG. 3(D), while the synchronized movements of the pair of the first bladder operating sleeve 41 and the bladder expansion control sleeve 100 on the upper side and the pair of the second bladder operating sleeve 42 and the bladder expansion control sleeve 43 on the lower side are performed to position the vulcanized tire TR to the loading/unloading position LP. Since the movable frame 70 is returned earlier to the elevated original position, the pair of the first bladder operating sleeve 41 and the bladder expansion control sleeve 100 on the upper side are elevated relative to the movable frame 70 after the same is stopped at the elevated original position, and the elevation movements of the first bladder operating sleeve 41 and the bladder expansion control sleeve 100 are continued to cooperate with the elevation movements of the pair of the second bladder operating sleeve 42 and the bladder expansion control sleeve 43 on the lower side to position the vulcanized tire TR to the loading/unloading position LP. In this way, the bladder 45 is removed to the loading/unloading position LP with itself remaining in the expanded state and holding the vulcanized tire TR from inside. Thereafter, the transfer device 16 enters the inside of the vulcanizer 10 from the outside thereof and grasps the outer circumferential surface of the vulcanized tire TR.

Upon confirmation that the vulcanized tire TR is grasped by the transfer device 16, the heated gas within the bladder 45 is discharged from the exhaust passage 41d of the first bladder operating sleeve 41, and the bladder 45 contracts. In this case, the bladder expansion control sleeve 100 and the bladder expansion control sleeve 43 are operated to come closer to each other inwardly from the respective positions aligning in height with the upper and lower bead portions of the vulcanized tire TR and help the contracting bladder 45 to peel or separate easily from the internal surface of the vulcanized tire TR. After once coming closer to each other, the bladder expansion control sleeve 100 and the bladder expansion control sleeve 43 are operated in the directions to go away from each other, and the bladder expansion control sleeve 100 is returned to a retracted position where it makes the end of the side surface restraining portion 100a at the lower end thereof align in height with the mold forming surface of the upper sidewall mold 72, and in parallel time relation with this, the bladder expansion control sleeve 43 is lowered so that the end of the bladder side surface restraining portion 43a at the upper end thereof is lowered to take a symmetrical position with respect to the center in the width direction (vertical direction) of the vulcanized tire TR. The approach and separation movements of the bladder expansion control sleeve 100 and the bladder expansion control sleeve 43 are carried out by controlling the servomotors 102 and 57 synchronously.

Further, the servomotors 76 and 51 are operated to be synchronized respectively with the servomotors 102 and 57, whereby the first bladder operating sleeve 41 remaining connected bodily with the connection cylinder 90 and the second bladder operating sleeve 42 are operated to approach and separate from each other to follow the approach and separation operations of the bladder expansion control sleeve 100 and the bladder expansion control sleeve 43. Thus, like the position shown in FIG. 3(B), the bladder expansion control sleeve 100 and the bladder expansion control sleeve 43 come to take respective positions symmetrical with respect to the center in the width direction of the vulcanized tire TR, and the side surface restraining portion 100a of the bladder expansion control sleeve 100 and the bladder side surface restraining portion 43a of the bladder expansion control sleeve 43 come to take symmetrical positions, whereby the bladder 45 comes to take a simple cylindrical shape.

Subsequently, the connection cylinder 90 and the first bladder operating sleeve 41 remaining connected bodily therewith and the second bladder operating sleeve 42 are lowered by the operations of the servomotors 96, 51 and are stopped at the same positions as those shown in FIG. 3(A). At this stop position, the first bladder operating sleeve 41 is seated at its lower end on the upper surface of the mold base member 20, in which state, the pair of air actuators 93 are operated to make the pair of connection claws 91 do a release operation, and thus, the first bladder operating sleeve 41 is separated from the connection with the connection cylinder 90. Then, the connection cylinder 90 is elevated by the operation of the servomotor 96 to be retracted to the upper end position, and the centering shaft 81 is retracted to the upper end position by the operation of the servomotor (not shown). Therefore, all the movable members are returned to their original positions shown in FIG. 1, and the transfer device 16 unloads the vulcanized tire TR outside the vulcanizer 10, whereupon the vulcanizing operation cycle of the vulcanizer 10 is terminated.

In the foregoing embodiment, the feed mechanism for each movable member of the type which rotates a screw shaft or a nut screw-engaged therewith by a servomotor or a conventional motor is shown to use a single screw shaft for each feed mechanism in the illustrated example. However, although the single screw shaft suffices for the mechanism, there may be used plural feed screw shafts arranged at an equiangular interval in a circumferential direction as described at several applicable parts in the description. Further, as fluid actuators like the actuators 93 for opening and closing the gripping claws 91, hydraulic actuators may be used instead of gas actuators.

Further, although the operation cycle of the vulcanizer described in the embodiment exemplifies a preferred operation cycle, it is possible to use any other operation cycle and to alter the operation cycle as need be.

INDUSTRIAL APPLICABILITY

The tire vulcanizing method and vulcanizer for practicing the method according to the present invention are suitable for the application in manufacturing tires for vehicle wheels.

The invention claimed is:

1. A tire vulcanizing method comprising the steps of:
loading a green tire into a segmented tread mold having been opened radially outward;
performing a vulcanization processing with the segmented tread mold closed radially inward and with a bladder expanded inside the green tire having been loaded; and
upon completion of the vulcanization processing, removing the vulcanized tire by opening the segmented tread mold radially outward;
wherein the bladder is expandable and contractible at a vulcanization position within the segmented tread mold as well as at a tire delivery position which is outside the segmented tread mold to be a predetermined distance away from the vulcanization position along the axis of the segmented tread mold; and
wherein the method includes the steps of:
expanding the bladder at the delivery position to make the bladder hold the green tire loaded into the tire delivery position;
making the bladder load the green tire into the segmented tread mold at the vulcanization position;
after the vulcanization processing, making the bladder in the expanded state remove the vulcanized tire from the vulcanization position to the delivery position; and
contracting the bladder at the delivery position for releasing the vulcanized tire from the bladder.

2. A tire vulcanizing method in a vertical vulcanizer wherein relative to a lower mold containing a green tire, an upper mold arranged over the lower mold in axial alignment with the same is lowered to combine the upper mold with the lower mold; and wherein a pair of bladder operating sleeves are movable vertically and respectively air-tightly bind upper and lower end ring portions of a bladder which is expanded inside the green tire;
the method including the steps of:
providing a single centering shaft that displaces the pair of bladder operating sleeves within a horizontal plane when said centering shaft is inserted into the pair of bladder operating sleeves;
making the single centering shaft pass through centers of the lower mold, the upper mold, the green tire, the bladder and the pair of bladder operating sleeves during a vulcanization by extending the single centering shaft from the upper mold into the pair of bladder operating sleeves; and
performing the vulcanization processing with the single centering shaft centering the pair of bladder operating sleeves relative to the lower mold and the upper mold through a displacement of the pair of bladder operating sleeves within the horizontal plane.

3. The tire vulcanizing method as set forth in claim 2, wherein the bladder is expandable and contractible at a vulcanization position inside a segmented tread mold which constitutes the lower mold to be opened and closed radially in a horizontal plane and is expandable and contractible also at a tire delivery position which is outside the segmented tread mold to be a predetermined distance upwardly away from the vulcanization potion along the axis of the segmented tread mold;
the method including the steps of:
expanding the bladder at the delivery position to make the bladder hold the green tire loaded into the tire delivery position;
making the bladder load the green tire into the segmented tread mold at the vulcanization position;
after the vulcanization processing, making the bladder remove the vulcanized tire from the vulcanization position to the delivery position; and
contracting the bladder at the delivery position for releasing the vulcanized tire from the bladder.

* * * * *